(12) United States Patent
Harriman

(10) Patent No.: US 11,301,411 B2
(45) Date of Patent: Apr. 12, 2022

(54) DATA STRUCTURES FOR REFINED LINK TRAINING

(71) Applicant: Intel Corporation, Santa Clara, CA (US)

(72) Inventor: David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 16/435,219

(22) Filed: Jun. 7, 2019

(65) Prior Publication Data

US 2019/0286605 A1  Sep. 19, 2019

(51) Int. Cl.
*G06F 13/42* (2006.01)
*G06F 16/901* (2019.01)

(52) U.S. Cl.
CPC ......... *G06F 13/4226* (2013.01); *G06F 13/42* (2013.01); *G06F 16/901* (2019.01); *G06F 2213/0026* (2013.01)

(58) Field of Classification Search
CPC ............ G06F 13/4226; G06F 16/901; G06F 2213/0026; G06F 13/42; G06F 13/14; G06F 13/38; G06F 13/00; H04L 1/0079; H04L 1/16
See application file for complete search history.

(56) References Cited

U.S. PATENT DOCUMENTS

| | | | | |
|---|---|---|---|---|
| 7,136,953 B1* | 11/2006 | Bisson | ............... | G06F 13/4018 710/307 |
| 7,447,965 B2* | 11/2008 | Brink | ............... | H04L 1/244 714/738 |
| 2014/0006670 A1* | 1/2014 | Wagh | ............... | G06F 13/4027 710/305 |
| 2014/0006675 A1* | 1/2014 | Meir | ............... | G06F 13/423 710/314 |
| 2014/0376548 A1* | 12/2014 | Naven | ............... | G06F 13/4282 370/389 |
| 2016/0371221 A1* | 12/2016 | Rosenberg | ............... | G06F 13/4022 |
| 2018/0329855 A1 | 11/2018 | Sharma | | |
| 2019/0042524 A1 | 2/2019 | Sharma | | |
| 2019/0050365 A1 | 2/2019 | Kopzon et al. | | |
| 2019/0131974 A1 | 5/2019 | Sharma | | |

OTHER PUBLICATIONS

India Patent Office; Office Action issued in IN Patent Application No. 202044010237, dated Jun. 28, 2021; 7 pages including English translation.

* cited by examiner

*Primary Examiner* — Idriss N Alrobaye
*Assistant Examiner* — Richard B Franklin
(74) *Attorney, Agent, or Firm* — Alliance IP, LLC

(57) ABSTRACT

A port of a computing device includes protocol circuitry to implement a particular interconnect protocol, where the protocol circuitry is to generate a set of ordered sets defined according to the particular interconnect protocol. The set of ordered sets is generated for a link to couple a first device to a second device and the set of ordered sets comprises link information for the link. Translation layer circuitry is provided to: generate, from the set of ordered sets, at least one data structure to comprise at least a portion of the link information, and cause the data structure to be sent from the first device to the second device on the link in lieu of the set of ordered sets.

20 Claims, 12 Drawing Sheets

DATA STRUCTURES FOR REFINED LINK TRAINING

FIELD

This disclosure pertains to computing system, and in particular (but not exclusively) to training for point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. Servers may also be implemented using distributed computing, in rack scale architectures, and other alternative implementations. As the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
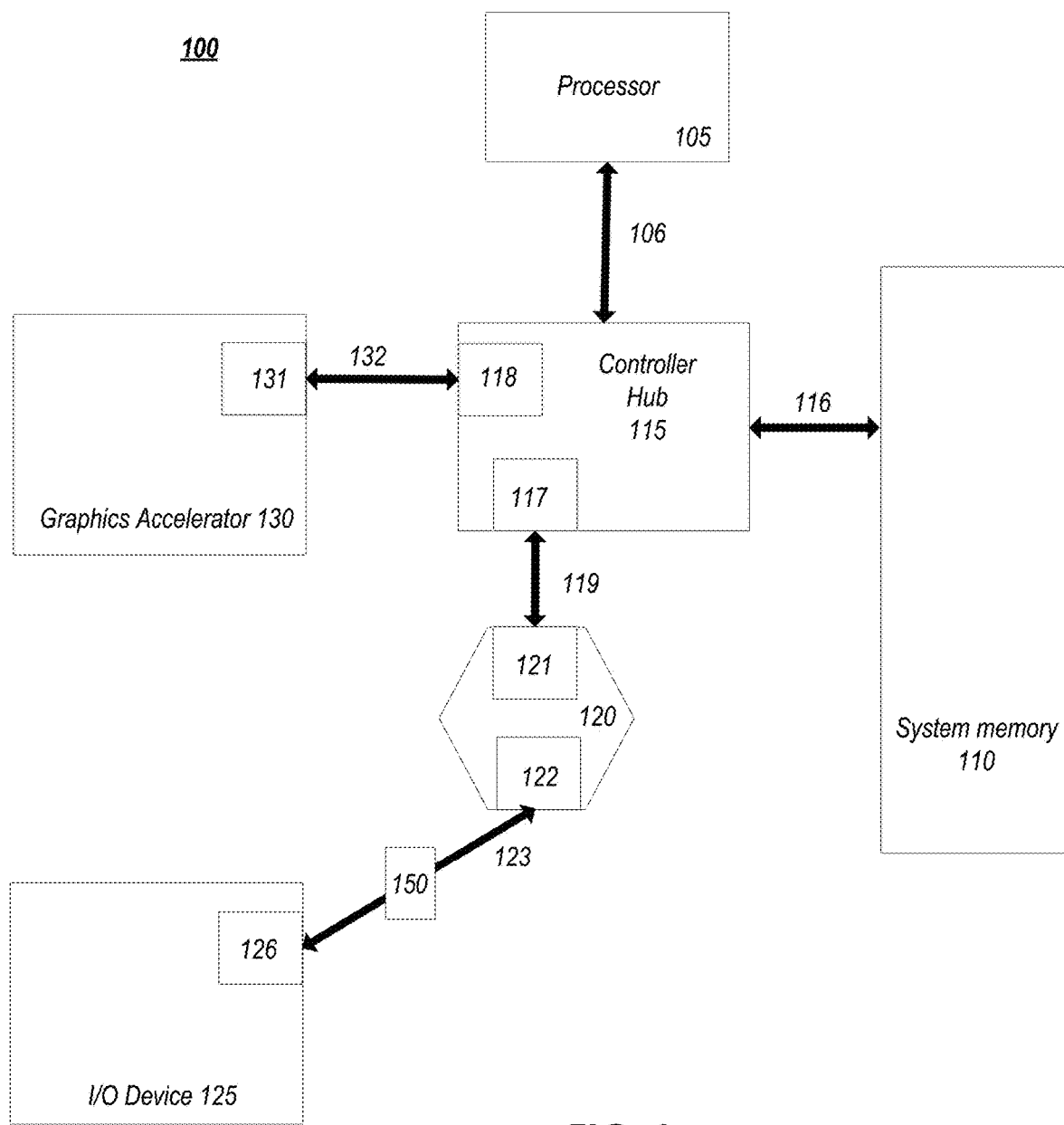
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, Cloud, Fog, Enterprise, etc.), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
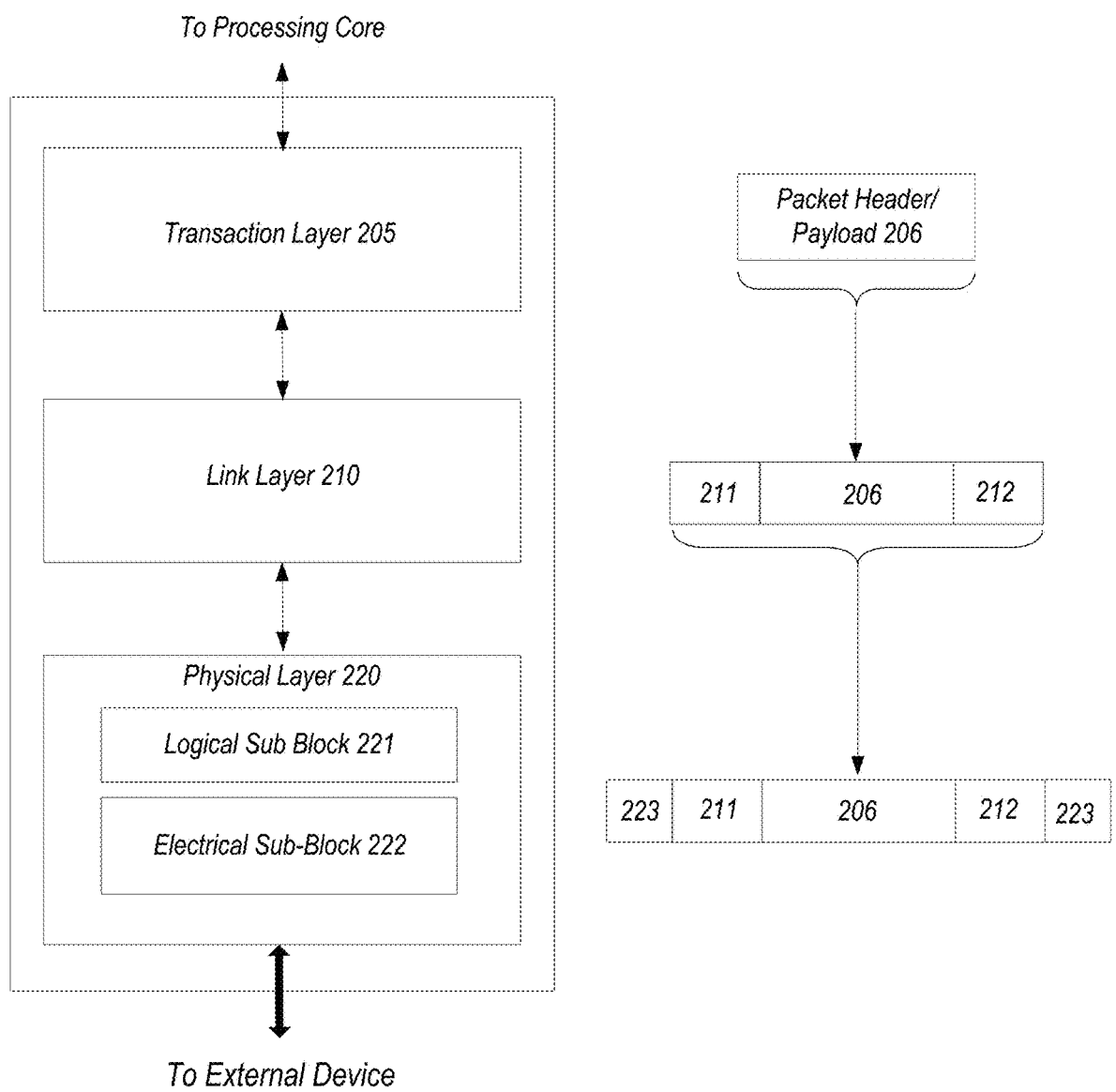
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
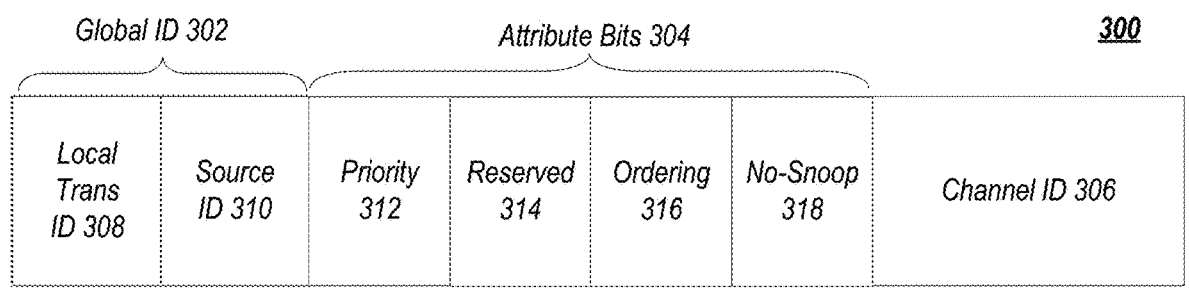
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes:

(1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
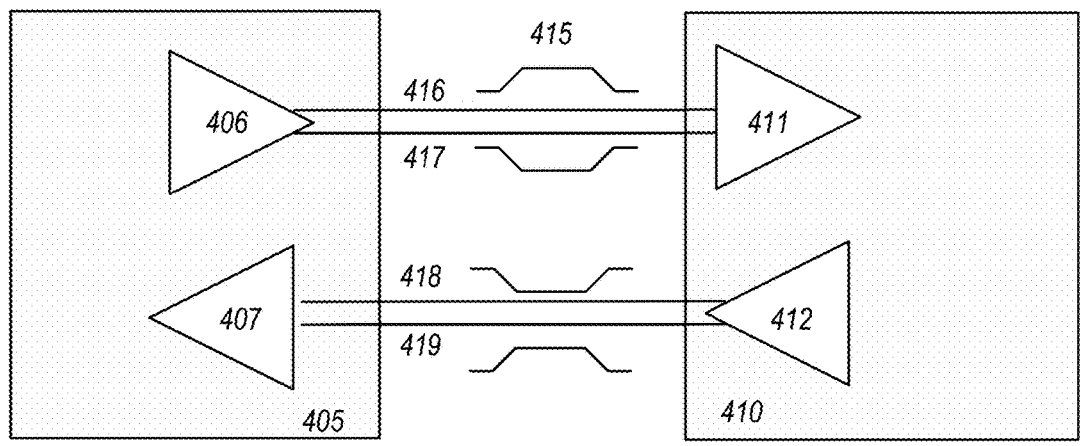
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Some interconnects designed and defined for use as general purpose I/O solutions, such as PCIe and other interconnects, may require links to be symmetric in their bandwidth capabilities. For instance, an interconnect protocol and its corresponding protocol stack implementations, may be defined to implement links with an equal number of lanes in both the transmit and receive directions and/or that the data speeds be the same in both transmit and receive directions. Indeed, in some implementations, the link training and state machines of the interconnect protocol, together with corresponding configurations registers and circuitry implementing the protocol, may be designed and implemented based on the assumption of bandwidth symmetry. While such a solution may be advantageous for general purpose I/O connections, such a design may also limit the protocol's use within other applications, where bandwidth demands may be fundamentally asymmetric. For example, interconnects for systems and devices such as graphical displays (e.g., where the data sent for display is exponentially greater than control signals sent back from the display unit), machine learning hardware (e.g., where sample data (e.g., images or video) input to a neural network is much larger than the data returned (e.g., a feature vector) as a result), sensors (e.g., wherein control signals to the sensor are modest compared with the sensor data (e.g., images, video, 3D point clouds, etc.) generated at the sensor), and storage media (e.g., with different read/write capabilities (e.g., Flash™ devices)), may advantageously utilize asymmetric connections (with unequal bandwidth between the transmit and receive directions). For instance, some applications may utilize more lanes and/or higher data speeds in the more demanding traffic direction. Accordingly, should such an application utilize technology designed for symmetric applications, the interconnect may be inefficiently overprovisioned in the other direction. Indeed, in more extreme asymmetric data flows, such as transport of camera or display data, the bandwidth requirements of the system may effectively be unidirectional, with only a very small back-channel required for control and link management, among other examples.

In light of the above, enabling support for asymmetric topologies using general purpose interconnects may be desirable to optimize for cost and power in applications where the bandwidth requirements are fundamentally asymmetric, such as occurs with many types of accelerators due to the computational requirements of their workloads, and for applications like storage where the read and write capabilities of the storage medium itself lead to differing link bandwidth requirements, among other examples. For instance, devices like image sensors and displays inherently have such highly asymmetric bandwidth requirements that asymmetric topologies are required for an economically viable implementation. Traditionally, such devices use special purpose connections (e.g., CSI for imagers, DisplayPort or HDMI for display, etc.) which have high speed connections in one direction only, and a separate control channel based on I²C or a similar type of "2 wire" IO. With refined link training (RLT), PCIe can be adapted even to specialized use cases like these, with the benefit of improved design reuse, implementation flexibility, and enabling new device capabilities, among other example advantages In some implementations, supplemental logic may be provided at at least one of the ports (e.g., the upstream or downstream port) connected through a bi-directional data link. For instance, a link formed according to a protocol, which assumes (or designed to accommodate) symmetric bandwidth, may be enhanced by such supplemental logic to enable asymmetric data links and the trainings of the same. For instance, a protocol stack of an interconnect, such as PCIe, may be supplemented by translation layer logic to enable links with asymmetric numbers of lanes and/or data speeds (e.g., for cases where high-speed is required in only one direction and a very low speed connection (e.g., I2C or I3C) is used for the backchannel, among other examples). Enabling such capabilities may be beneficial in many platform environments, including embedded (e.g., IoT) platforms where implementing a general purpose I/O (e.g., PCIe) may require the over-design of devices, making such interconnect solutions a non-starter for inherently asymmetric applications, among other example considerations and advantages.

As introduced above, implementations of refined link training may enable the optimization of links with asymmetric requirements and thereby allow general purpose I/O solutions to be extended to asymmetric application, where before doing so would be unsuitable in terms of power, cost, and other example disadvantages. By extending the feasibility and applicability of a general purpose interconnect platform, such as PCIe, to more specialized applications, where asymmetric bandwidth and other unique link functionality desirable, a system may integrate and even re-use well-developed and trusted general purpose interconnect solutions, rather than engineering a custom I/O solution. For instance, through RLT, an interconnect such as PCIe may serve as the foundation for building special-purpose I/O solutions (rather than relying on additional or custom-built I/O solutions) to improve product flexibility, for instance, by enabling "late binding" at the time of board or system design, modularizing the I/O of general purpose system on chip (SoC) devices and other devices, without requiring devices to be over-provisioned, among other example benefits.

Figure 5A:
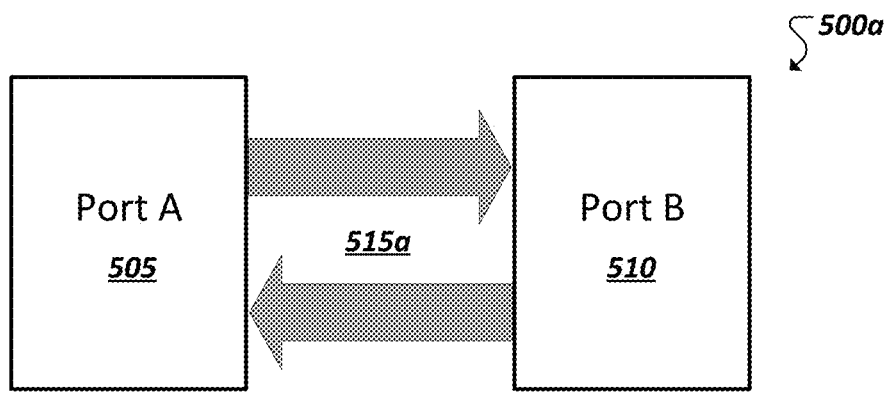
FIGS. 5A-5C are simplified block diagrams of ports connected by example link topologies.

As introduced above, refined link training solution may enable PCIe and similar interconnects that may require symmetric high-speed link configurations to support asymmetric link configurations, including where there are high speed serial capabilities in one direction only. For instance, turning to FIGS. 5A-5C, simplified block diagrams 500a-c are shown illustrating example link topologies of some example systems. FIG. 5A shows an example of a traditional, symmetrical link 515a connecting two ports 505, 510. Each port device 505, 510 may include circuitry to implement and train the link 515a, and then utilize the trained link for communication of data between two devices. Each port device (e.g., 505, 510) in this example, may include a respective transmit (Tx) port and a receive (Rx) port. A link may be considered the connection between the Tx port of one device and the Rx port of another. In the case of bi-directional communication channels, the Tx port of each device is connected to the Rx port of the other forming two links in an upstream (e.g., toward a host processor) and downstream (e.g., away from the host processor) direction, or a bi-directional link (also referred to herein collectively as a "link"). A symmetrical link (e.g., 515a) may include equal numbers of lanes in the upstream and downstream directions, with each of the upstream and downstream link supporting the same data transmission speeds. Such a link (e.g., 515a) may be implemented without provided for RLT, or translation, logic in addition to or instead of one or more layers of an underlying general-purpose interconnect protocol. However, some implementations of a symmetrical link may nonetheless utilize RLT, for instance, to support additional features or embodiments that fall outside of the base interconnect protocol specification, allowing additional or different link information content to be sent and implemented on the link 515a.

Figure 5B:
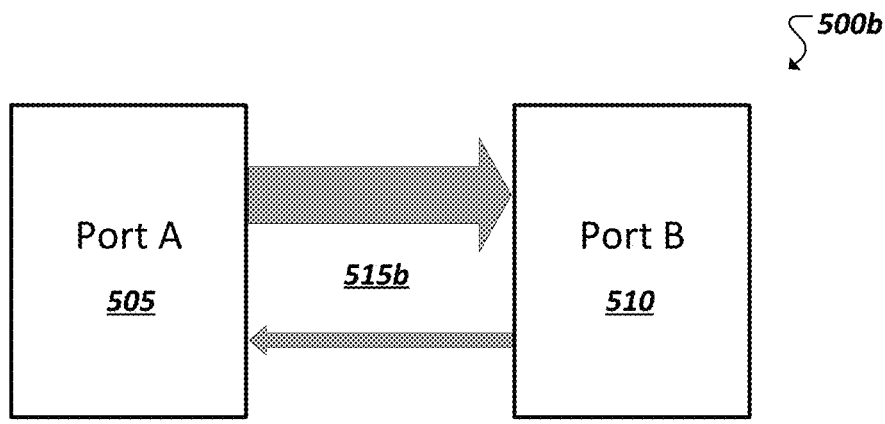
Figure 5C:
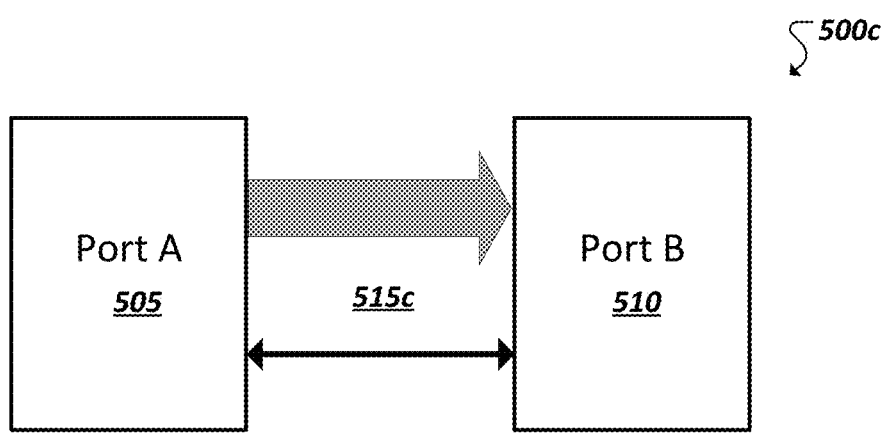

The examples of FIGS. 5B and 5C show examples of asymmetric links (e.g., 515b, 515c). As discussed above, RLT solutions and logic may be utilized to extend, enhance, or otherwise modify the functionality of an underlying general-purpose interconnect protocol (e.g., PCIe) to enable asymmetric links built upon the interconnect protocol (even when the interconnect protocol does not natively support asymmetric bandwidth). For instance, in the example of FIG. 5B, an RLT layer may be provided to allow a link 515b where the number of lanes in one direction outnumber the number of lanes in the return direction. FIG. 5C shows an example of a link 515c where high-speed signaling exists in only one direction, with a low speed interface (represented by the thinner arrow) (e.g., I2C, I3C, etc.) being used for a back channel. Such a link 515c may also be facilitated and enabled utilizing a corresponding RLT layer, among other examples.

A solution that enables the modification of native link training and control signaling of an interconnect, such as RLT, may also enable and/or improve upon the modularity and extensibility of the interconnect's link training mechanisms (e.g., physical layer link training), which in some cases have evolved to be extremely complicated and difficult to understand and implement. For instance, when backwards compatibility is not required, this approach can allow aspects of the state machine for link training (e.g., the link training and status state machine (LTSSM)) to be greatly simplified or customized based on the attributes of a specific solution, while at the same time providing a clean path to enable new capabilities.

As introduced above, a refined link training (RLT) capability may be provided on a system to enable a PCIe-based or other interconnect that typically requires symmetric high-speed link configurations to support asymmetric link configurations, including where there are high speed serial capabilities in one direction only. For instance, an interconnect may define various ordered sets and training sequences during training of a link, and these ordered sets and the manner in which they are communicated, may be defined in an interconnect protocol based on the assumption of a symmetric link. For instance, PCIe may use various ordered sets for the physical layer of the protocol stack to communicate information and negotiate and synchronize link state transitions. However, such ordered sets have evolved, in some cases, to become quite complex. Moreover, in some implementations, such as PCIe, instances of ordered sets and training sequences may be sent on each lane of the link, thereby implicitly carrying lane-specific information in each instances of the ordered set (e.g., based on the ordered set being sent/received on a given lane).

In some implementations, logic may be provided, in hardware circuitry and/or supporting software, to implement an RLT layer. For instance, in refined link training (RLT), link information content that is defined to be carried within various ordered sets of a protocol, and thereby facilitate link training, link state transitions, acknowledgements, status and control signaling, and other uses, may be separated from the ordered sets (e.g., as generated by the protocol's physical and/or data link layers) and converted (and reformatted) into data structures defined outside of the protocol. Indeed, such data structures may be defined based on the specific application for which a link is to be provided, including applications of asymmetric bandwidth. The data structure may then be transmitted on the link instead of the standard, protocol-defined ordered sets, with some implementations enabling such data structures to be transmitted in a manner agnostic to the medium (e.g., the physical characteristics (e.g., link width or speed) of the link).

Figure 6A:
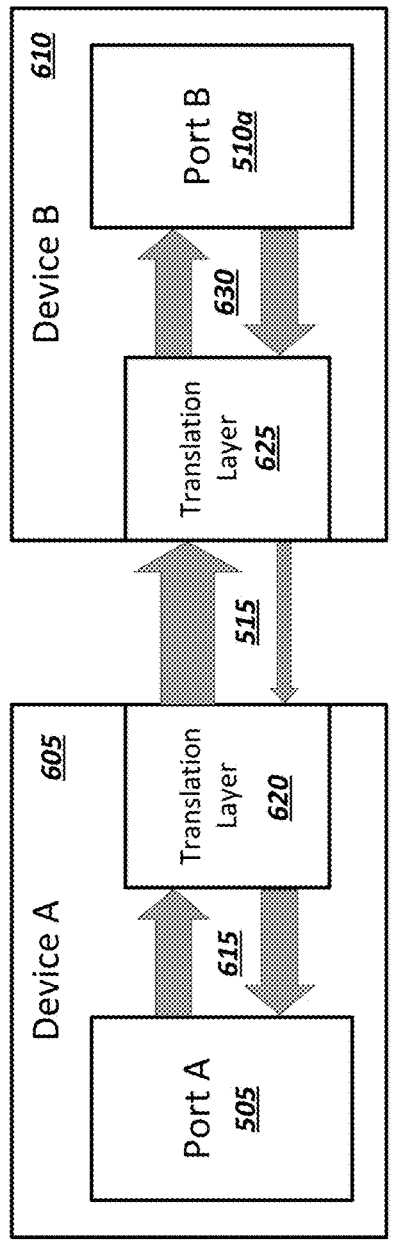
FIGS. 6A-6B are simplified block diagrams of example devices connected by links enabled by example translation layers.
Figure 6B:
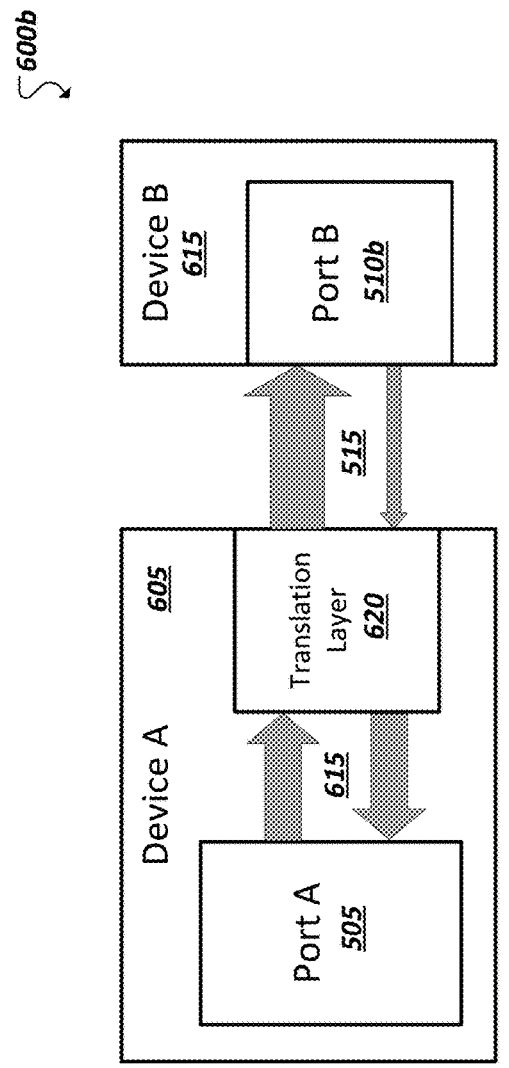

Turning to FIGS. 6A-6B, simplified block diagrams 600a-b are shown illustrating example devices 605, 610, which are to communicate over an asymmetrical link 515 topology. In some implementations, RLT may be facilitated, in whole, through a translation layer (e.g., 620, 625). In other instances, RLT may be implemented through a modified version of a general purpose protocol stack, with the RLT layer supplanting other layers or functionality defined in a base version of the interconnect protocol. A translation layer may be provided to supplement a standard interconnect protocol stack (e.g., implemented in ports 505, 510a) with the RLT layer. The RLT layer may augment or modify the standard interconnect protocol stack, such as the physical layer of the stack, to change the content link information and/or how it is communicated, and negotiating and synchronizing links state transitions involving link information content. For instance, protocol circuitry of port 505 may be configured to generate ordered set and corresponding link information content based on an assumption that the actual physical link (e.g., 515) is symmetrical or otherwise defined according to the protocol circuitry's corresponding interconnect protocol. The ordered set data may be communicated by the protocol circuitry over an interface 615 coupling the protocol circuitry of the port 505 with an RLT translation layer 620. In some cases, from the view of the protocol circuitry, the generated ordered sets (for a certain number of lanes) has been sent. However, in reality, the translation layer 620 may intercept the ordered set data, parse the ordered sets, and identify which (if any) link information contained in the ordered set data is germane to the particular topology of the link 515. The translation layer 620 may generate a data structure to include link information that is needed to establish the link 515, which may or may not include information from the ordered set data. The translation layer 620 may then cause the data structure to be sent over lanes of the link 515 to the other device 610 coupled to the link 515 in lieu of the ordered sets. Likewise, ordered sets generated by the protocol circuitry of the other device's (e.g., 610) port 510*a* (and sent to the translation layer 625 over interface 630), may be translated by the device's translation layer 625 into a data structure defined for the link topology (e.g., instead of sending the ordered sets themselves).

In the example of FIG. 6A, RLT functionality is implemented at each of devices 605, 610 using a corresponding translation layer 620, 625. In some alternative implementations, rather than providing a translation layer (e.g., 625) as a layer to supplement the protocol circuitry of the port (e.g., 510*a*), as shown in the example of FIG. 6B, some implementations may instead implement an RLT layer and associated functionality through a modified version of the protocol circuitry, such that the RLT functionality is implemented natively at the port (e.g., 510*b*). An RLT layer may be implementation-specific, with different implementations of an RLT layer being provided to support and generate data structures configured for use in training and establishing a link in a corresponding one of potentially many different link topographies. For instance, an RLT layer may encode/decode ordered sets generated by an underlying interconnect protocol according to the needs and capabilities of the actual physical interface, so as to make the physical interface appear (to the underlying protocol stack) to be a symmetric or otherwise specification-compliant interface.

To support a link, each side of the link (e.g., 605 and 615) may be provided with an RLT layer of the same type, such that each side is able to generate and send RLT data structures of a defined structure that the other RLT layer may receive and decode to successfully train and establish the link. As shown in the examples of FIGS. 6A-6B, this common RLT layer may be implemented in either the protocol logic of the device (as with device 615 in FIG. 6B) or through separate translation layers (as with devices 605 and 610) supplementing standard interconnect protocol logic, among other example implementations.

RLT data structures may be regarded as a "containers," with a structure and fields defined to be readable and compatible with each device connected by the corresponding link. The data structure may be defined to include that information needed to implement the particular link topology connected the two devices. Accordingly, all or fewer than all of the link information content defined in an underlying ordered set (defined by the base protocol) may be included in the data structure. Indeed, such protocol-defined fields may be supplemented by additional fields to include additional information (e.g., not defined or considered in the interconnect protocol's specification). In some implementations, a data structure may be defined to include additional reserved fields. Such reserved fields may embody reserved fields defined in the underlying ordered set such that future use of those fields can be enabled without change to the translation layer. In another case, reserved fields may be included for the use of the translation layer itself, for example to provide for capabilities that have no correspondence in the underlying interconnect protocol (e.g., PCIe), such as physical-link-specific power management and other features. In addition, in implementations where the ordered sets of the underlying protocol are protected by parity or other error detection features, a data structure may be provided with additional fields to enable similar (or even enhanced) data error and/or correction capabilities. For instance, while ordered sets may be protected through parity bits, an RLT data structure may be equipped with a cyclic redundancy check (CRC) or error correction code (ECC) field to replace the error detection capabilities in the existing ordered set as appropriate for the error properties of the medium used, among other example data structure fields.

Figure 7A:
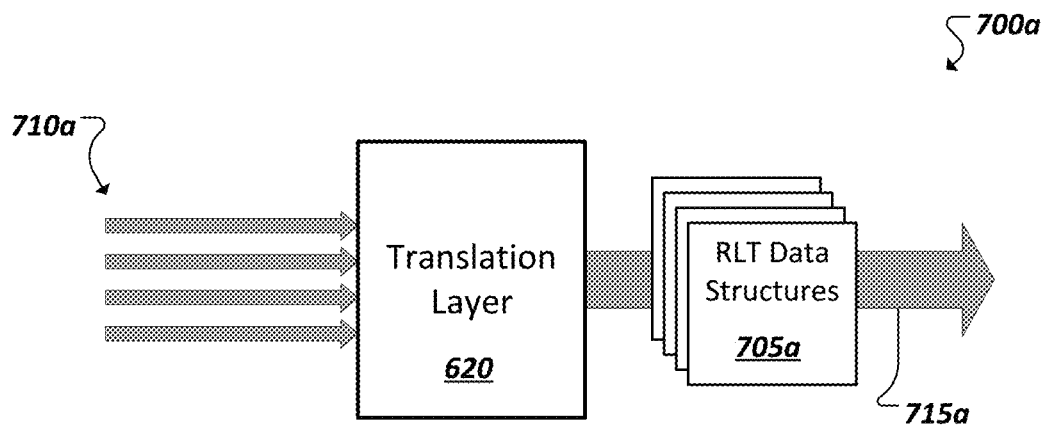
FIGS. 7A-7B are simplified block diagrams illustrating operation of example translation layers.
Figure 7B:
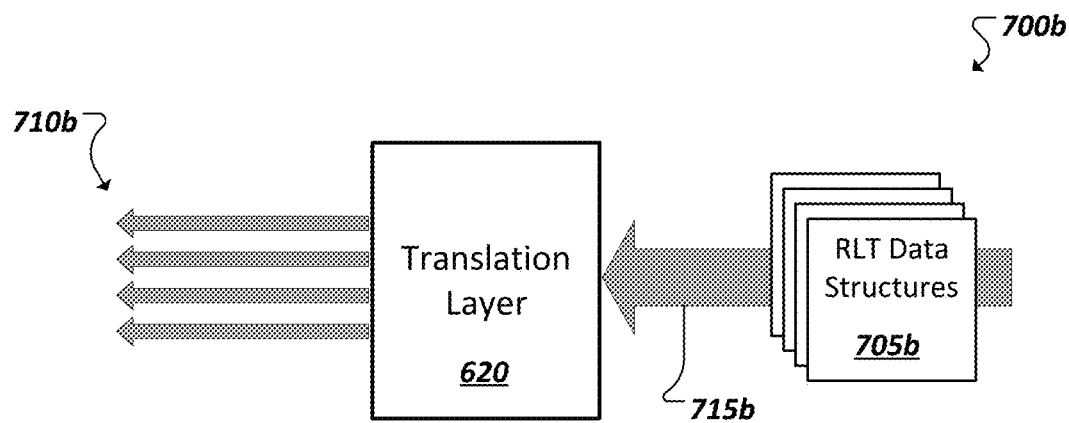

Turning to FIGS. 7A-7B, simplified block diagrams 700*a-b* are shown illustrating an example translation layer (e.g., 620) for translating between RLT data structures and ordered sets based on a particular interconnect protocol. For instance, in FIG. 7A, a view of an example transmitter port is shown including a translation layer 620. Circuitry implementing a protocol stack of an example interconnect protocol may generate various ordered sets 710*a* according to the protocol, such as electrical ordered sets, training sequences, SKP ordered sets, and other data sequences for use in establishing a link. In some implementations, a protocol may require that a given ordered set be sent concurrently on each lane of the link. In one example, the protocol stack may generate a number of ordered sets 710*a* based on the assumption that the link will constitute the same number of lanes. The translation layer 620 may intercept the ordered sets 710*a* before they are sent out on the physical link interface 715*a*. Depending on the implementation of the translation layer 620 (which may be based on the type of link interface 715*a* for which the translation layer is to adapt link training and configuration activities), the translation layer 620 may extract or keep various link information communicated through the ordered sets 710*a* and potentially drop or filter out other link information. The translation layer 620, upon identifying the link information to be kept, may encode the information in one or more RLT data structures 715*a* defined in accordance with the translation layer implementation. The translation layer 620 may cause these data structures to be sent in lieu of the ordered sets 710*a* generated by the protocol stack.

Turning to FIG. 7B, an example translation layer 620 may also be used to decode RLT data structures (e.g., 705*b*) generated by and received from another port connected on the link using medium 715*b*. Accordingly, the translation layer 620 may receive a set of one or more data structures 705*b*, which include link information for use in establishing a link on the particular physical medium 715*b*. The translation layer 620 may extract and use the necessary link information in the received data structure 705*b* and also use this (or other) information contained in the data structure 705*b* to generate synthetic ordered set data 710*b* to deliver to the protocol stack. For instance, where the physical medium 715 only include two physical lanes, the protocol stack may assume that eight physical lanes were used, and the translation layer 620 may receive a set of data structures 705*b*, use information included in the data structure to configure and train the two-lane link, and further generate a set of eight ordered sets 710*b* (corresponding to the assumed grouping of eight lanes used in the link) for consumption by the protocol stack. The synthetic ordered sets 710*b* may be generated in such a manner as to convince the protocol stack that these were actual received on the link, as well as to communicate link information to the protocol stack in manner the protocol stack understands so as to further the establishment and training of the link (e.g., by encoding relevant link information received in the data structure 705*b* within corresponding fields of the synthetic ordered sets, among other examples.

In some implementations, at least some link information generated by a protocol stack for a link may be not be relevant or useful in the training of the actual physical link (e.g., 715*a,b*). In some cases, a translation layer (e.g., 620) may simply filter out and ignore this information and exclude such extraneous information from data structures (e.g., 705*a*) it generates. Alternatively, in some implementations, a translation layer 620 may nonetheless be configured to encode data structures with at least some link information from received ordered sets (e.g., 710*a*) and send this information on to the RLT layer of the other port on the link. For instance, such information may be useful to a receiving translation layer in generating realistic synthetic ordered sets (e.g., 710*b*) from the data structure (e.g., as the link information in the ordered sets may need to be repeated or referenced in later generated synthetic ordered sets), among other example uses.

As noted above, in some implementations, link information can be based on the link information already defined in the ordered sets of an underlying protocol. Indeed, in some implementations, an RLT data structure generated for an asymmetric connection may follow the structure of link information content for the symmetric link defined according to the protocol. Such an approach may simplify the RLT layer in some implementations. Indeed, at least a portion of fields in the data structure may be borrowed from or mirror fields defined in the ordered set from which the data structure is generated. In some instances, link information in the data structure may also include fewer or different information, such as information to enable new or topology-specific features not supported in the underlying general-purpose interconnect protocol or to provide for greater flexibility in link configuration and operation, among other example considerations.

As noted above, in some interconnect protocols, ordered sets and link information content carried therein, have evolved to be quite complex. Using PCIe as one illustrative example, link information content of a PCIe-based protocol may include: identification that the port exists (implied); description of the physical capabilities of a port; operational parameters negotiated for the link (e.g., selected at run time, as changed during normal link operation (e.g., at defined times and/or in association with specific link state transitions, etc.)); requests for or acknowledgement of a link state transition (e.g., which may sometimes be implicit, e.g. through the change of a data field value); SKP OS data payload information (e.g., runtime command/status tied to the high-speed data path (such as used in lane margining at the receiver)); among other examples.

As a more detailed (and non-limiting) example, Tables 1-5 illustrate example link information (as defined in PCIe), which may be encoded in RLT data structures in some implementations. For instance, Table 1 lists example explicit link information content of Standard and EQ TS1 Ordered Sets of PCIe:

TABLE 1

Standard and EQ TS1 Ordered Sets Link Information Content

| Field | Values/Use | RLT Mapping |
| --- | --- | --- |
| Link Number | 0-31/255 or PAD (F7h) | Port Description |
| Lane Number within Link | 0-31 or PAD (F7h) | Port Description |
| N_FTS | 0-255 | Port Description |
| Data Rate Identifier [5:0] | Supported Data Rates | Port Description; Negotiation of operational parameters |
| Data Rate Identifier[6] - Autonomous Change/Selectable De-emphasis | State change request/ack | State Change; Negotiation of operational parameters |
| Data Rate Identifier[7] - speed_change | State change request/ack | State Change; Negotiation of operational parameters |
| Training Control[0] - Hot Reset | State change request/ack | State Change |
| Training Control[1] - Disable Link | State change request/ack | State Change |
| Training Control[2] - Loopback | State change request/ack | State Change |
| Training Control[3] - Disable Scrambling | State change request/ack | State Change |
| Training Control[4] - Compliance Receive | State change request/ack | State Change |
| Training Control[5] - Transmit Modified Compliance Pattern in Loopback | State change request/ack | State Change |
| Training Control[6:7] - Enhanced Link Behavior Control | Indicates capabilities & requirements of Port; encoded: 00b - Full Equalization Required | Port Description |

TABLE 1-continued

Standard and EQ TS1 Ordered Sets Link Information Content

| Field | Values/Use | RLT Mapping |
|---|---|---|
|  | 01b - Equalization bypass to highest rate support | |
|  | 10b - No Equalization needed | |
|  | 11b - Modified TS1/TS2 Ordered Sets supported | |
| EQ 8 GT/s - Receiver Preset Hint[2:0] | Equalization negotiation protocol | Negotiation of operational parameters |
| EQ 8 GT/s & 32 GT/s - Transmitter Preset [6:3] | Equalization negotiation protocol; encoded | Negotiation of operational parameters |
| EQ 32 GT/s - Transmitter Precode Request | Equalization negotiation protocol; encoded | Negotiation of operational parameters |
| EQ 32 GT/s - Transmitter Preset[6:3] |  | Negotiation of operational parameters |
| Equalization Control [1:0] | Equalization negotiation protocol | Negotiation of operational parameters |
| Reset EIEOS Interval Count | magic | Negotiation of operational parameters |
| Transmitter Preset | Equalization negotiation protocol | Negotiation of operational parameters |
| Use Preset/Equalization Redo | Equalization negotiation protocol | Negotiation of operational parameters |
| Transmitter Coefficient FS[5:0] | Equalization negotiation protocol | Negotiation of operational parameters |
| Transmitter Coefficient LS[5:0] | Equalization negotiation protocol | Negotiation of operational parameters |
| Transmitter Precoding on | Equalization negotiation protocol | Negotiation of operational parameters |
| Retimer Equalization Extend | Equalization negotiation protocol | Negotiation of operational parameters |
| Post-Cursor Coefficient[5:0] | Equalization negotiation protocol | Negotiation of operational parameters |
| Reject Coefficient Values | Equalization negotiation protocol | Negotiation of operational parameters |
| Parity | parity calculated across some of the fields above | Replaced with full integrity check |

Similarly, Table 2 lists example link information content of Standard and EQ TS2 Ordered Sets (only where they differ from the link information content discussed for TS1 Ordered Sets in Table 1):

TABLE 2

Standard and EQ TS2 Ordered Sets Link Information Content

| Field | Values/Use | RLT Mapping |
|---|---|---|
| Training Control[4] - Retimer Present | 0b - No retimers<br>1b - one or more retimers | Retimers may be present only on the high-speed data path, and so this functionality must be retained there |
| Training Control[5] - Two Retimers Present | 0b - Zero or one retimer<br>1b - Two (or more) retimers | as above |
| Equalization Request Data Rate[5:4] | Equalization negotiation protocol; encoded:<br>00b - 8 GT/s<br>10b - 16 GT/s<br>01b - 32 GT/s<br>11b - Reserved | Negotiation of operational parameters |
| Quiesce Guarantee | Equalization negotiation protocol | Negotiation of operational parameters |
| Request Equalization | Equalization negotiation protocol | Negotiation of operational parameters |

Table 3 lists the link information content of Modified TS1/TS2 Ordered Sets in PCIe (only where they differ from the link information content discussed for TS1 Ordered Sets in Table 1):

TABLE 3

Modified TS1/TS2 Ordered Sets Link Information Content

| Field | Values/Use | RLT Mapping |
|---|---|---|
| Link Upconfigure Capability | Port capable of up-configure | Port Description |
| Modified TS Usage[2:0] | Modified TS mechanism; encoded:<br>000b - PCIe protocol only<br>001b - PCIe protocol only with vendor defined Training Set Messages<br>010b - Alternate Protocol Negotiation | Port Description; Negotiation of operational parameters |
| Modified TS Information 1[15:3] | Modified TS mechanism | Port Description; Negotiation of operational parameters |
| Training Set Message Vendor ID[15:0]/<br>Alternate Protocol Vendor ID[15:0] | VID for above | Port Description; Negotiation of operational parameters |
| Modified TS Information 2[15:0] | Modified TS mechanism | Port Description; Negotiation of operational parameters |

Continuing with this example, Table 4 lists the example link information content of Standard SKP Ordered Sets in PCIe (using 128b/130b Encoding):

TABLE 4

Standard SKP OS Link Information Content

| Field | Values/Use | RLT Mapping |
|---|---|---|
| Polling.Compliance: Error_Status[7:0] | Test feature | Negotiation of operational parameters |

Table 5 lists the link information content of Control SKP Ordered Sets of PCIe (using 128b/130b Encoding):

| Field | Values/Use | RLT Mapping |
|---|---|---|
| Margin CRC[4:0] | (Related to) Test feature | Negotiation of operational parameters |
| Data Parity | (Related to) Test feature | Negotiation of operational parameters |
| First Retimer Data Parity | (Related to) Test feature | Negotiation of operational parameters |
| Second Retimer Parity | (Related to) Test feature | Negotiation of operational parameters |
| Margin Parity | (Related to) Test feature | Negotiation of operational parameters |
| misc 1[6:0] | Test feature; Margin Type[5:3]; Receiver Number[2:0] | Negotiation of operational parameters |
| misc 2[7:0] | Test feature; Margin Payload[7:0] | Negotiation of operational parameters |

It should be appreciated that Tables 1-5 illustrate some non-limiting examples of link information, which may be incorporated in example RLT data structures. For instance, while the examples in Tables 1-5 reference next generation and later generation PCIe interconnects (e.g., utilizing 128b/130b encoding for speeds of 8 GT/s onwards), the principles of RLT discussed herein are equally applicable to legacy PCIe interconnects (e.g., using 8b/10b in 2.5 GT/s and 5 GT/s implementations), as well as other interconnect protocols and future encoding schemes, among other alternative systems. Accordingly, other link information (as defined in these other protocols and protocol versions) may be alternatively included in corresponding RLT data structures, among other non-protocol defined information.

In some implementations, an implementation of an RLT data structure supported by a pair of devices may define multiple types of the data structure and a particular one of the types may be selected based on the activity, the state of the link, or the type of ordered sets being converted through the data structure, among other examples. For instance, different data structure formats or types may be defined for each of multiple types of ordered sets of a particular interconnect protocol. As an example, in a PCIe implementation, one type of data structure may be defined for use when converting, or virtualizing, training sets (TS) and another type of data structure may be defined for use in virtualizing SKP ordered sets (SKP OSes), among other examples.

In some implementations, ordered set may be utilized in order to facilitate the training and synchronizations of links with high-speed serial I/O (HSIO) capabilities in one or both directions. In some instances, RLT data structures, alone, may be ill-suited for replacing the ordered set patterns replied upon in training high-speed links. Accordingly, in some implementations, example translation layer or other logic may identify patterns within an ordered set that are utilized in HISO training and may pass an unmodified version of the pattern onto lanes of the link as received from the protocol stack. As an example, in PCIe, ordered set functionality that may continue to implement the high speed interface may include Training Ordered Set (TS) patterns used to establish bit and block/symbol lock, SKP (Skip) Ordered Sets to allow compensation for differences in clocking, Electrical Idle Exit Ordered Sets (EIEOS), among other examples. In some cases, an ordered set may include both a pattern (e.g., a sync pattern) utilized for critical link training and synchronization activities (e.g., bit lock and/or symbol lock in high speed I/O applications) as well as informational content for the link. In such instances, a translation layer or other logic may identify the pattern and link information in the generated ordered set and separate the pattern from the link pattern, transmitting the pattern in its original form, while repackaging the link information content in a data structure to be sent separate from the pattern (e.g., after the pattern is sent) on the link, among other examples. For example, in some instances, rather than modifying the ordered set to detach a particular pattern, translation logic may allow the entire ordered set to be transmitted, as is, on the link if the pattern or information in the ordered set is critical for high-speed link training. In some cases, the translation logic may also send a data structure with the link information content in addition to allowing the ordered set to be transmitted in full (e.g., even if doing so would be redundant to the information contained in the ordered set), for instance, if the port on the other side of the link (e.g., with a modified version of the interconnect protocol stack) only possess logic for processing link information content when received in a data structure of a particular format, among other example implementations. In still other implementations, some ordered sets defined by an interconnect protocol may include no link information content. For instance, a PCIe Electrical Idle Ordered Set (EIOS) may contain no substantive information per se (other than identifying that the transmitter is transitioning to Electrical Idle). In such instances, rather than translating the ordered set into a data structure, the full ordered set may be allowed to be transmitted over the lanes of the actual link, among other example implementations.

While some implementations of a translation layer may allow sequences in some ordered sets to be forwarded in their original form on to the physical link to facilitate high speed link training, in some alternative embodiments, the high-speed link training sequences defined by the underlying interconnect protocol may be ill-suited for performing high speed training on the actual physical link. For instance, the physical medium may possess characteristics or operate at speeds that are not aligned with definitions and requirements of the interconnect protocol. Accordingly, in some implementations, an example translation layer may detect the presence of a sequence defined by the interconnect protocol for performing one or more link training activities and replace the sequence with a different sequence more appropriate to performing the link training activities on the actual physical communication medium being used for the link. For instance, a mapping may be defined at the translation layer to identify and replace protocol-defined link training sequences, with substitute link training sequences designed to serve the same purpose, but optimized for the actual characteristics of the link, among other example features and implementations.

In some implementations, an interconnect protocol may provide for link information contained in ordered sets to be associated by implication with the lane upon which it is sent. For instance, a protocol may define that a separate instance of a particular ordered set is to be sent on each lane during training of the link, with each lane's instance of the ordered set carrying information (e.g., equalization settings, configuration parameters, etc.) specific to the lane on which it is sent. However, in other implementations of an RLT data structure, the data structure (and supporting logic) may be configured to send each data structure on one or multiple lanes of a link, and link information contained in the data structure may pertain specifically to a lane other than one or more of the lanes used to communicate the data structure. For instance, the bits of a single data structure containing link information content for one particular lane of the link be sent by striping, swizzling, or otherwise using all of the available lanes. In still other implementations, a data structure may contain link information corresponding to multiple lanes or the physical medium generally (e.g., where the medium does not include multiple lanes or utilizes a "non-lane-based" topology (e.g., a coaxial medium)), and this data structure may be sent using one or more multiple lanes (or other conductors), among other example implementations.

Figure 8A:
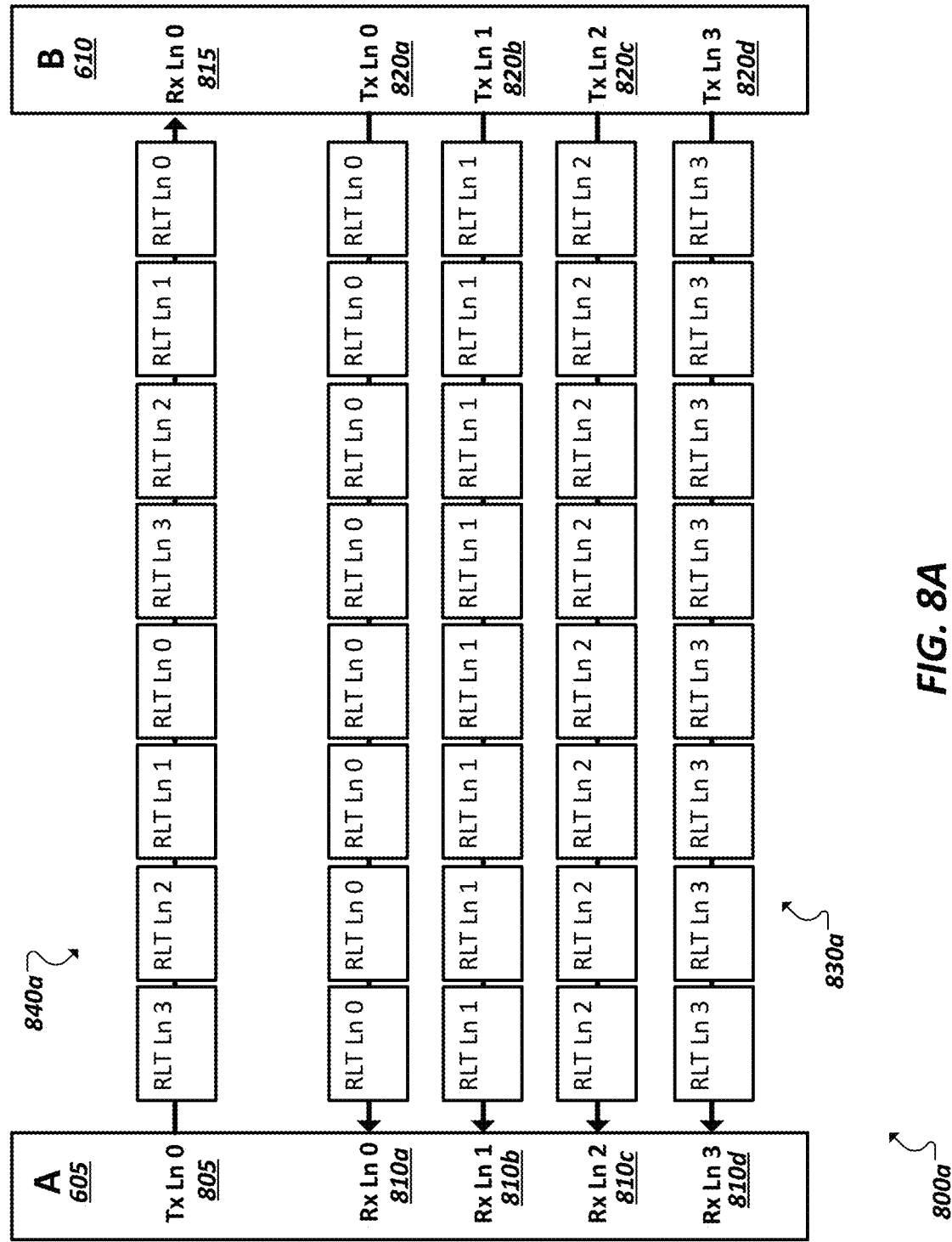
FIGS. 8A-8C are simplified block diagrams illustrating communication of example data structures over the media of example physical connections.
Figure 8B:
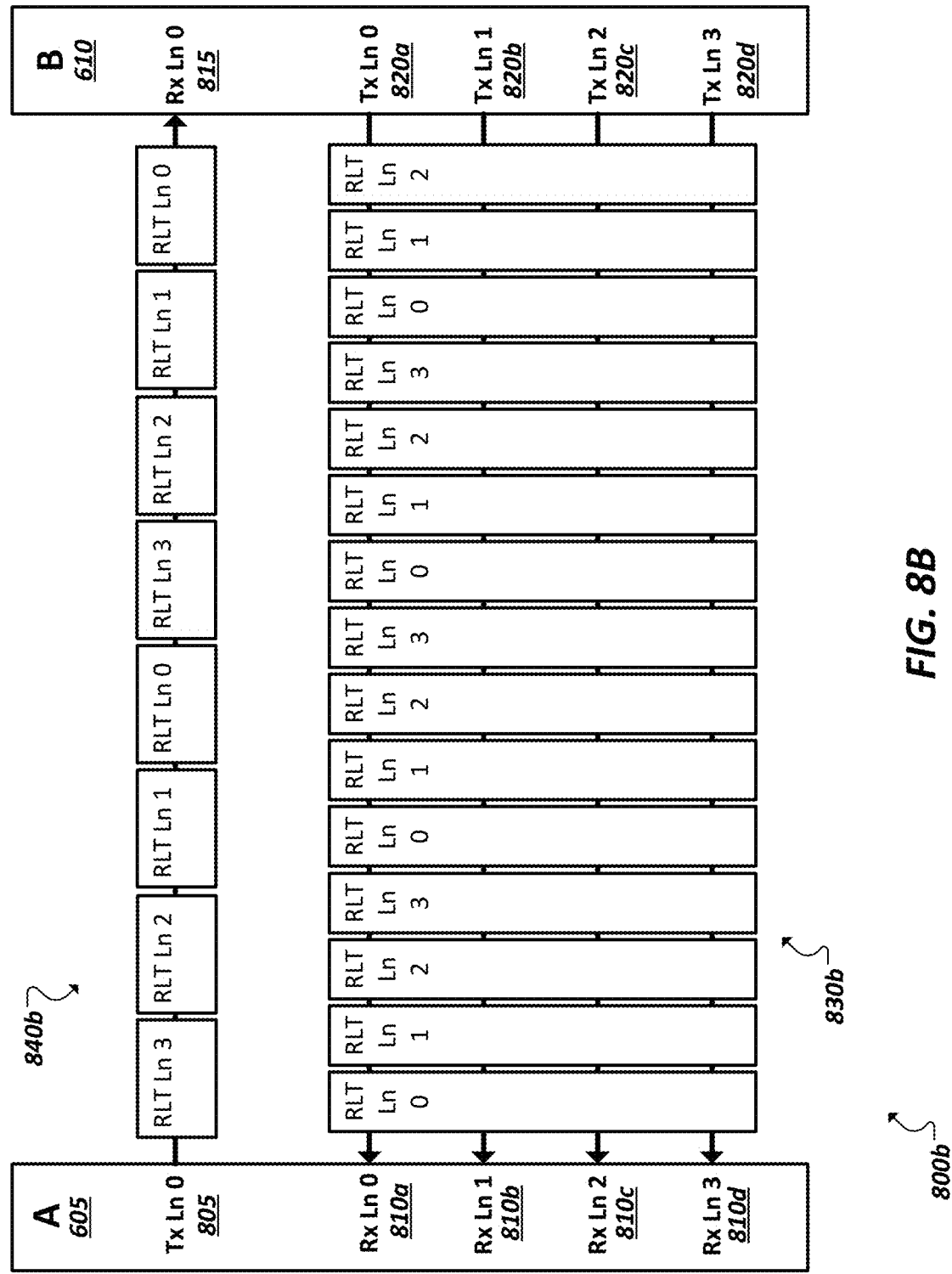
Figure 8C:
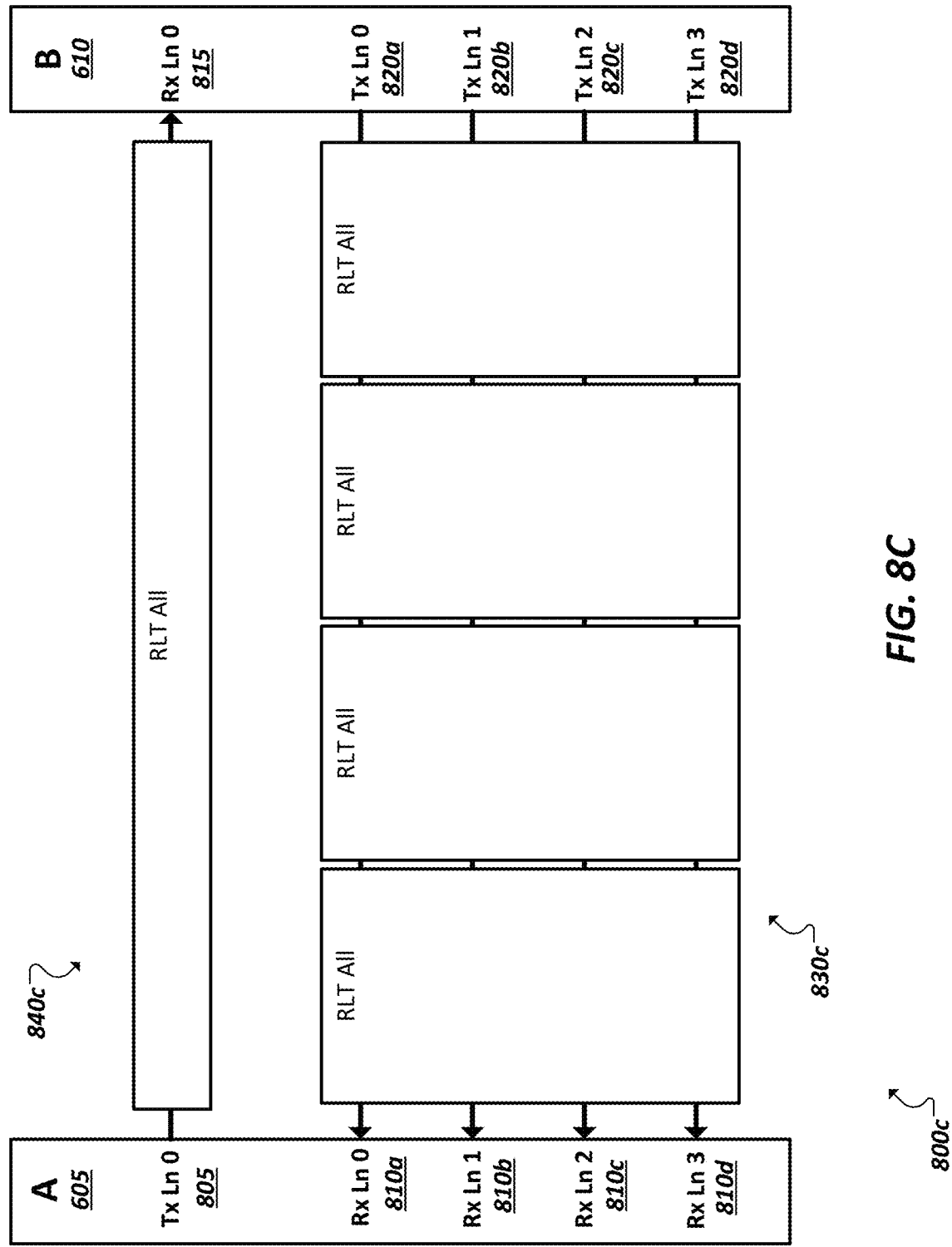

Turning to the examples of FIGS. 8A-8C, simplified block diagrams 800a-c are shown illustrating the sending of example RLT data structures over a physical communication medium. For instance, in each of the examples of FIGS. 8A-8C, a first device 605 is to communicate with a second device 610 over an asymmetric connection. For instance, device A 605 may utilize one transmit lane 805 and four receive lanes 810a-d. In complimentary fashion, device B 610 may include a single receive lane 815 and four transmit lanes 820a-d. It should be appreciated that the number and topology shown in these examples is for illustration purposes, and RLT-based links may utilize potentially any number of lanes and ratios between upstream and downstream lanes, among other alternative embodiments. Further, while the examples of FIGS. 8A-8C each describes instances where the physical medium utilizes multiple lanes, it should be appreciated that the RLT layers may also be developed and used, according to the principles discusses herein, to enable use of non-lane-based link topologies.

In the example of FIG. 8A, an example is shown whereby an RLT layer resident in the protocol stack itself or a translation layer of each of devices A and B (605, 610) is configured to generate RLT data structures to effectively virtualize lane-specific ordered sets generated in accordance with an underlying general-purpose interconnect protocol (e.g., PCIe). For instance, RLT data structures 830a sent from device 610 to device 605 may be generated such that each data structure (in 830a) includes the link information for a particular one of the lanes that is used to implement the link. Further, the data structure carrying the link information for a particular lane may, where possible, be sent using that same lane, as shown with the example data structures 830a. However, in the example of an asymmetric connections, such as in FIG. 8A, it may be expected that lane specific data structures be returned (e.g., to assist in generated synthetic ordered sets for consumption by the underlying protocol stack, or as part of a handshake or acknowledgement during link training, etc.), but the number of lanes in the return direction (e.g., from device 605 to device 610) may be fewer than the number in the forward direction. Accordingly, rather than sending lane-specific RLT data structures on the dedicated lanes, data structures (e.g., 840a) with information for a different lane or even multiple different lanes may be carried using a particular physical lane (e.g., with a lane being used to multiplex data structures of multiple lanes, such as in the example of FIG. 8A). For instance, in examples such as that illustrated in FIG. 8A, lane specific link information carried by data structures 830a may apply to device 610 on a per lane basis, while link information applying to device 605 (e.g., a request to change speed) may effectively be duplicated through the multiple lanes' worth of link information included in the data structures 840a transmitted using the lane, among other example implementations.

As discussed above, some implementations of an RLT layer may carry link information for one or more particular lanes. While the applicability of a given ordered set to a particular lane is sometimes defined implicitly (e.g., by sending that ordered set on the corresponding lane), such may not be required in implementations of RLT data structures. Indeed, in instances where data structures are not defined to be sent on a particular corresponding lane, but include lane-specific link information content, the data structure may be formatted to include a field to identify which particular lane(s) (e.g., by lane number) the link information of the data structure applies to. Multiple RLT data structures may be used, in such cases, with each data structure corresponding to, and identifying, its corresponding lane, among other example implementations. For instance, an RLT data structure may include a field, such as an "Applies To" field to indicate which lane(s) the data structure's link information pertains to, among other example embodiments.

While some implementations of an RLT layer may be configured to send individual data structures on individual lanes (e.g., even where the data structures carry information for a lane different from the one being used to transmit the data structure), in other implementations, an RLT layer may utilize multiple lanes to send a single data structure, such as illustrated in the example of FIG. 8B. For instance, example RLT data structures (e.g., 830*b*) configured to carry lane-specific link information (e.g., mapped to corresponding ordered sets generated by an underlying protocol stack) may be provided, as in the example of FIG. 8A. However, in some implementations, rather than a single lane being used to transmit an RLT data structure, multiple (or all available) lanes of a medium may be used to transmit a single data structure, for instance, by striping bits of the data structure across the multiple lanes of a link (e.g., as illustrated with data structures 830*b*). In such implementations, where the other side of an asymmetric connection only maintains a single lane, such a topology may necessitate the sending of data structures (e.g., 840*b*) using a single lane, among other examples. Further, while the examples of FIGS. 8A-8B describe RLT data structures carrying link information a single lane or corresponding to a single instance of an ordered set of an underlying protocol, it should be appreciated that the format of a data structure and link information it is defined to carry may not be so constrained. Indeed, RLT layers may be defined to enable training of unconventional, proprietary, and non-traditional links, and the format and content of a corresponding RLT data structure may be similarly open and flexible to such use cases. For instance, as illustrated in the example of FIG. 8C, data structures (e.g., 830*c*, 840*c*) may be defined in some implementations to carry any link information needed to train a corresponding medium, which, in some cases, may be agnostic to individual lane; include link information for multiple lanes within the same data structure; include link information that is irrelevant to the actual training of the link, but may be useful to RLT layers in constructing synthetic ordered sets to communicate link training results to an underlying protocol stack, among other example alternatives and embodiments.

Indeed, the form and manner of transmitting RLT data structures (e.g., over one or more multiple lanes) may vary greatly from implementation to implementation. For instance, RLT data structures may be formatted and communicated as modified version of or to virtualize ordered sets of a protocol, as different types of packet-like structures, among other examples. Whichever data structure form is defined for a particular RLT layer implementation, the overall structure should be consistently defined such that the data structure may be reliably encoded and decoded and to allow translation layer implementations to reconstruct the equivalent ordered sets defined in an underlying protocol stack (e.g., for a conventional, symmetric PCIe link). In implementations, where the actual link applies lower speed or will otherwise not utilize training sequences for performing critical high-speed I/O tasks (e.g., bit lock and symbol lock), packet-like RLT data structures may be utilized (which forego such sequences). In other cases, a mix of high-speed training sequences and data structures may be generated and sent by an RLT layer to enable high speed link training. In still other examples, the RLT data structures can be communicated as writes to "registers" associated with and for consumption by another RLT layer, among other example implementations. In such instances, an RLT layer (e.g., implemented as a translation layer) may not only translate the data that is sent over the link, but also effectively enable low speed connections (and asymmetric connections), where the underlying protocol stack assumes and views the link as a high-speed, symmetric link, among other example features.

The nature and features of an RLT layer implementation may be determined based on the physical and electrical characteristics of the link the RLT is adapted to train and configure. Likewise, data structure formats generated and utilized by a given RLT layer implementation may be driven by the characteristics of the corresponding link to be trained. In some examples, it may be necessary to loosen the timing requirements of an underlying interconnect protocol (e.g., PCIe) in connection with the application of an RLT layer, such as to accommodate the reduced bandwidth available for asymmetric connections. For instance, for highly asymmetric configurations it may be necessary to modify timings for NAK and Flow Control and possibly other mechanisms, such as a Completion Timeout mechanism. If compatibility with existing implementations is valued, then such changes or relaxed treatment of protocol-defined features may be avoided. In other cases, however, compatibility may be less critical, making it desirable to relax the timing requirements more broadly in some implementation (e.g. for both symmetric and asymmetric configurations), for instance, to avoid the need for special-case handling. Additionally, in some implementations, introduction of an RLT layer may result in the modification of compliance mechanisms (e.g., for operation in asymmetric configurations). Further, in addition to changes to physical layer operation brought on through the introduction of an RLT layer, in some implementations, changes may also be made at higher protocol layers (e.g., the Data Link and Transaction Layers). For instance, registers defined for an underlying protocol may assume as symmetric Link, and for backwards compatibility these would be implemented so as reflect a symmetric link even in asymmetric configurations (e.g., as if the link were actually symmetric and operating in both directions at the higher bandwidth of the asymmetric connection). Accordingly, in some implementations, new, additional registers may be implemented (e.g., through an Extended capability Structure) to provide for the discovery, configuration and management of the asymmetric connection where such capabilities are to be enabled through a corresponding RLT layer, among other example changes and features.

Figure 9:
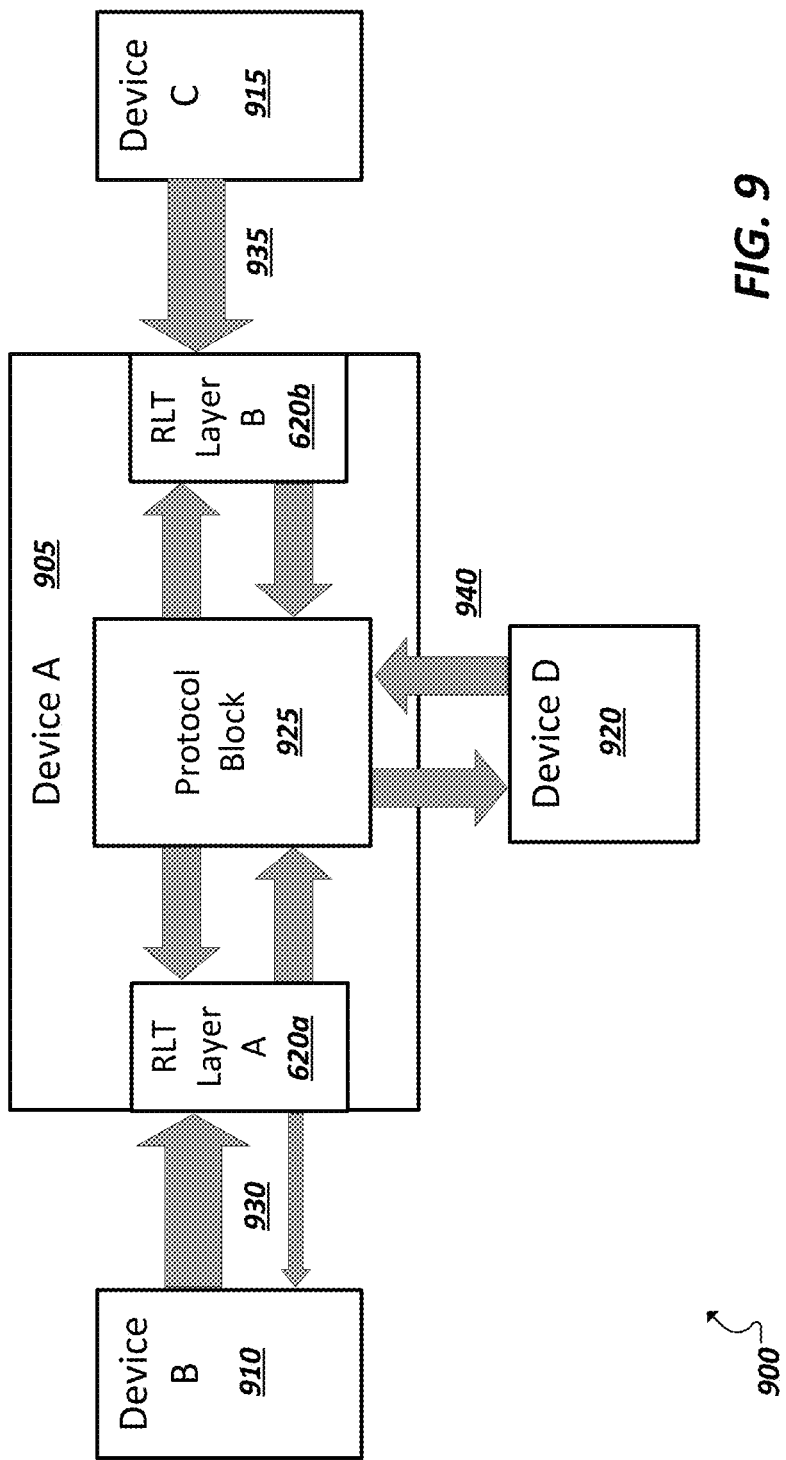
FIG. 9 is a simplified block diagram of an example computing device connected to one or more different devices by respective example links.

Turning to FIG. 9, a simplified block diagram 900 is shown illustrating an example system utilizing one or more RLT layer logic blocks (e.g., 620*a-b*) to flexibly utilize particular interconnect protocol logic (e.g., 925), designed to implement a protocol stack of a particular interconnect protocol, to support potentially multiple different types of links (e.g., 930, 935, 940), including links (e.g., 930, 935) that are not in compliance with link characteristics of the particular protocol (e.g., due to asymmetry (e.g., in data speed, number of lanes, overall bandwidth in receive and transmit paths, etc.), electrical or physical characteristics of the link's communication medium, modified link training features, modified state machines, etc.). For instance, a device 905 may be provided to implement a configurable or programmable switch device, system-on-chip (SoC) device, or other computing device. An interconnect protocol block 925 may be provided, together with a set of transmit lanes and receive lanes, which may be flexibly provisioned to implement one or more ports. The interconnect protocol block 925, in this example, may be used to implement a general-purpose I/O protocol defining certain native characteristics for links based on the protocol (e.g., certain data speeds, certain physical transmission media (e.g., certain electrical or physical characteristics), symmetric bandwidth in the transmit and receive directions, etc.). However, certain applications may involve connecting the device 905 to other devices (e.g., 910, 915, 920), at least some of which possess functionality or consumer or generate data, which make aspects of the general-purpose interconnect protocol sub-optimal.

In the example of FIG. 9, the flexible device 905 may utilize the native functionality of an interconnect protocol block 925 to implement a port that is fully-compliant with and uses the native functionality of the interconnect protocol block 925 to implement a specification-compliant link 940 without the need or use of an RLT layer (e.g., where the link 940 is trained and established using standard ordered sets according to the particular interconnect protocol). However, connections (e.g., 930, 935) to other devices (e.g., 910, 915) may optimally utilize customized or otherwise non-spec-compliant links, based on characteristics of the devices 910, 915. For instance, a device (e.g., 910) may have asymmetric bandwidth demands, such as a display device, camera device, storage device, machine learning accelerator, or other device. Accordingly, an RLT layer may be defined and implemented (e.g., as a translation layer 620a) adapted to facilitate the training and establishment of an asymmetric link connection 930 tuned to the bandwidth needs of the device 910. The RLT layer 620a may encode and decode particular data structures to be used in lieu of ordered sets of the particular interconnect protocol to enable the asymmetric link, while still leveraging features and higher layers (e.g., link layers, transaction layers, protocol layers, etc.) of the protocol. For instance, RLT layer 620a may convert ordered sets generated by the protocol block 925 for use on the link(s) 930 into the corresponding data structure and convert data structures received from the device 910 into synthetic ordered sets for consumption by the interconnect protocol block 925.

Different RLT layers may be used to implement different types of connections. For instance, a different RLT layer (e.g., 620b) may be utilized to establish a connection 935 with device 915. This example device 915 may possess purely unidirectional bandwidth characteristics (e.g., as a sensor device, which merely generates data without a control path, among other examples). The optimal connection for this device 915 may be different from those of device 910, based on functional differences between the devices. Accordingly, another RLT layer (e.g., 620b) may be defined and implemented (e.g., as a translation layer) to generate data structures to enable training and establishment of corresponding links, while leveraging the particular interconnect protocol (e.g., PCIe). In this example, RLT layer 620b may effectively ignore any ordered sets generated by the protocol block 925 for a downstream link from device 905 to device 915, as no link will in fact be implemented in this direction. The RLT layer 620b may nonetheless support the generation of synthetic ordered sets to "trick" the protocol block 925 into believing not only that such a downstream link exists, but that it is compliant with the characteristics defined for the particular interconnect protocol. Likewise, the RLT layer 620b may convert ordered sets generated for the upstream port into data structures, which include link information tuned for training and establishing the unidirectional connection 935, among other examples.

As should be appreciated through the example illustrated in FIG. 9, RLT layers may be advantageously implemented and used to flexibly extend the application of a general-purpose interconnect protocol to facilitate a diverse range of different links, including those in some way non-compliant with the standards defined in the interconnect protocol. In the example of FIG. 9, RLT layers may be programmatically implemented to enable an interconnect block 925 to be extended to support diverse types of connections (including standard connections (e.g., 940). These connections (e.g., 930, 940, 945) may enable optimized communication with similarly diverse devices (e.g., 910, 915, 920). Where connections (e.g., 930, 935) utilize an RLT layer, the downstream device (e.g., 910, 915) may implement a similar, corresponding RLT layer either natively as the default interconnect circuitry of the device, or also as a translation layer (e.g., to modify a standard implementation of an underlying general-purpose interconnect stack (e.g., similar to interconnect protocol block 925), among other examples. Indeed, some implementations of the underlying interconnect protocol may be defined so as to also native adopt RLT mechanisms (e.g., as defined capability), for instance, to replace traditional mechanisms (e.g., link training defined in an earlier version of the protocol) with greater structure and generality, which may work to simplify the link training state machines and their associated protocols, while providing a clean way to add functionality, among other example advantages and implementations.

The foregoing disclosure has presented a number of example embodiments for flexibly extending link training capabilities of example interconnect protocols. It should be appreciated that other implementations may be provided in addition to those identified above without departing from the more generalized principles contained within this disclosure. For instance, while some of the examples discussed herein were described with reference to protocols requiring bandwidth symmetry or other standard features (e.g., PCIe or PCIe-based protocols), it should be appreciated that similar, corresponding enhancements (and corresponding RLT layers) may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 10:
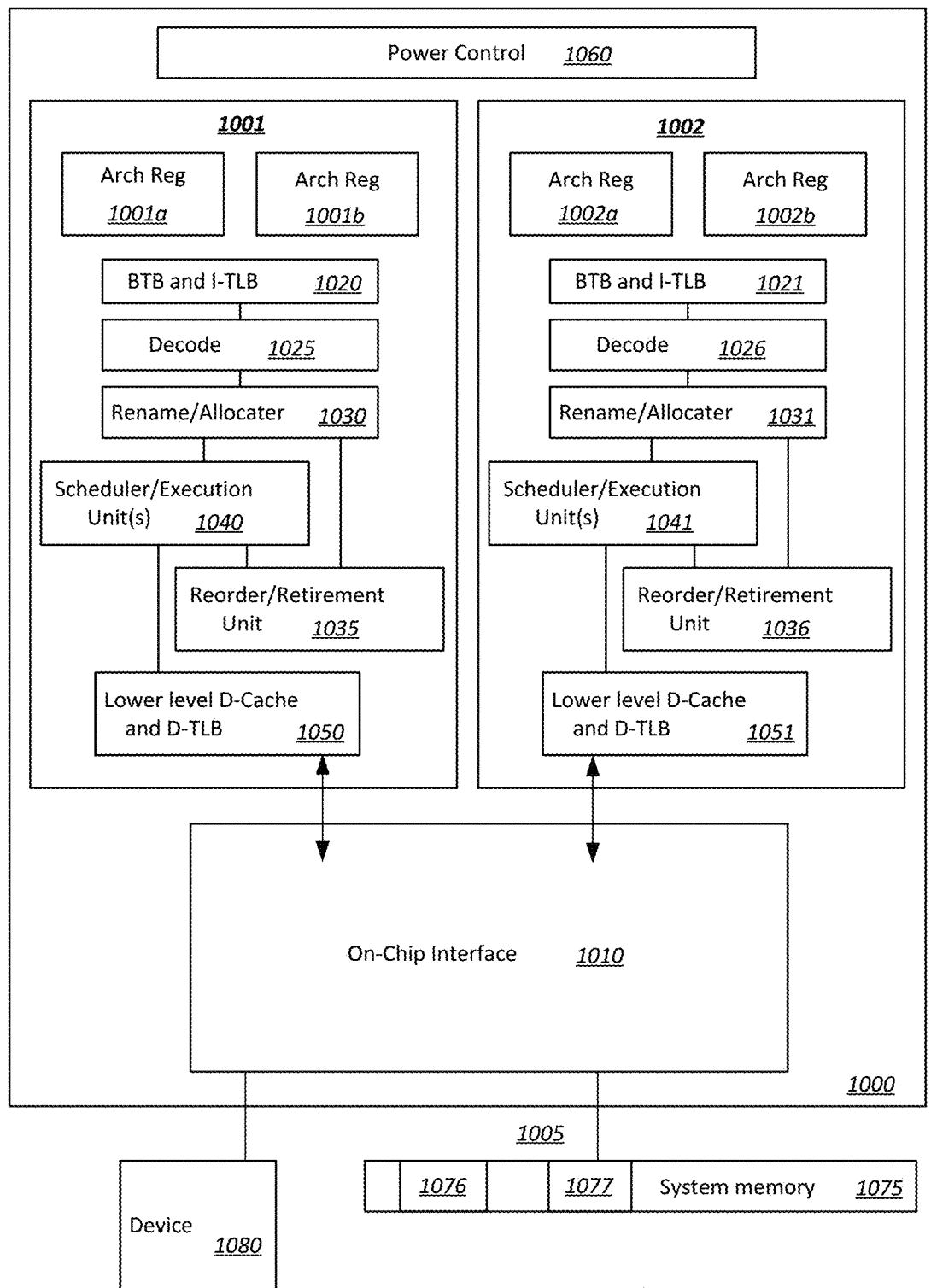
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001*a* and 1001*b*, which may also be referred to as hardware thread slots 1001*a* and 1001*b*. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001*a*, a second thread is associated with architecture state registers 1001*b*, a third thread may be associated with architecture state registers 1002*a*, and a fourth thread may be associated with architecture state registers 1002*b*. Here, each of the architecture state registers (1301*a*, 1001*b*, 1002*a*, and 1002*b*) may be referred to as processing elements, thread slots, or thread units, as described above. As illustrated, architecture state registers 1001*a* are replicated in architecture state registers 1001*b*, so individual architecture states/contexts are capable of being stored for logical processor 1001*a* and logical processor 1001*b*. In core 1001, other smaller resources, such as instruction pointers and renaming logic in allocator and renamer block 1030 may also be replicated for threads 1001*a* and 1001*b*. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001*a*, 1001*b*, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001*a* and 1001*b* are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
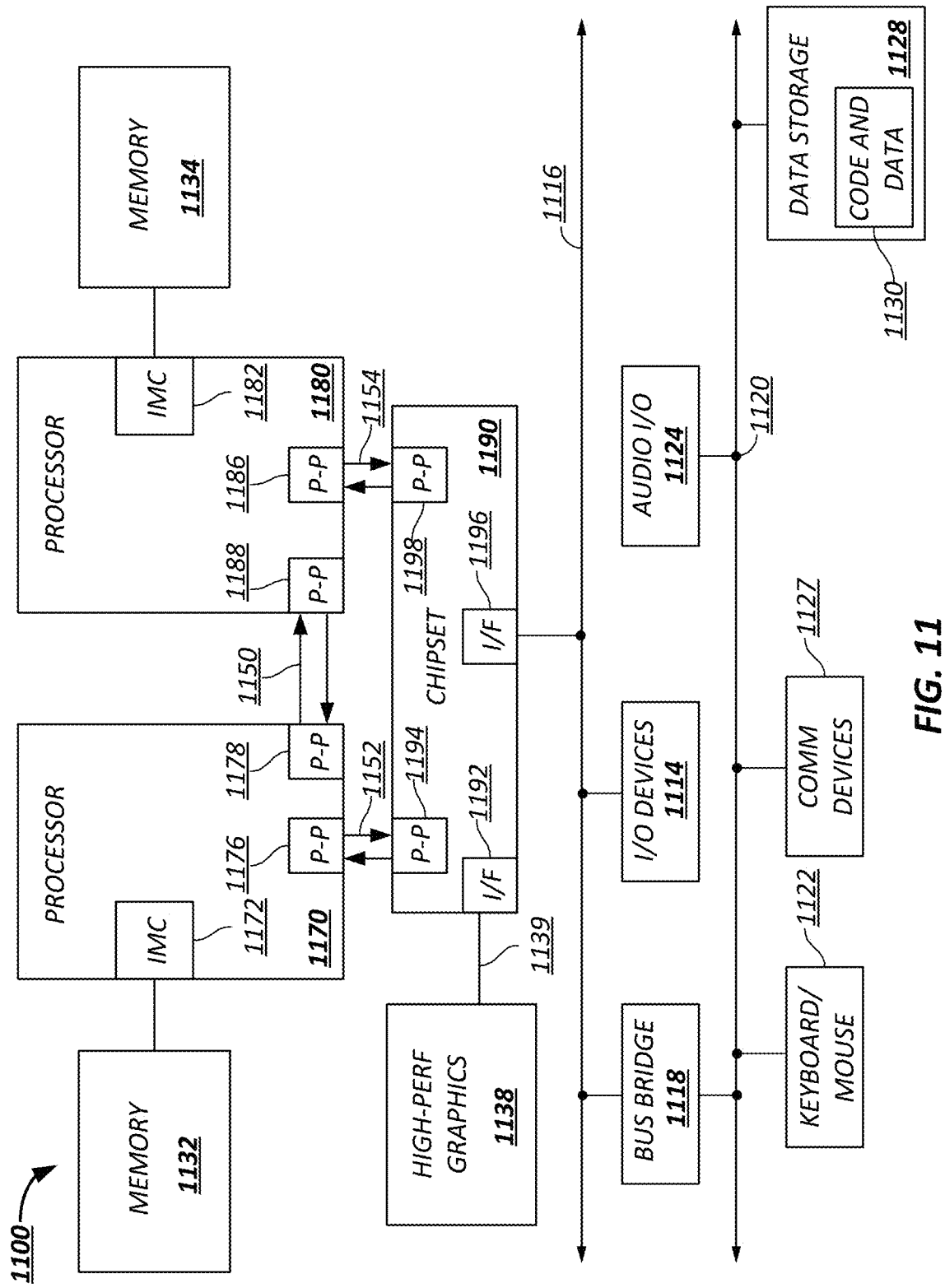
FIG. 11 illustrates an embodiment of a block for a computing system including multiple processors.

Referring now to FIG. 11, shown is a block diagram of another system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as a high-performance architecture. As a result, the invention may be implemented within the QPI architecture.

While shown with only two processors 1170, 1180, it is to be understood that the scope of the present invention is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: protocol circuitry to implement a protocol stack of a particular interconnect protocol, where the protocol circuitry is to generate a set of ordered sets defined according to the particular interconnect protocol, the set of ordered sets is generated for a link to couple a first device to a second device, and the set of ordered sets includes link information for the link; and translation layer circuitry to: generate, from the set of ordered sets, at least one data structure to include at least a portion of the link information; and cause the data structure to be sent from the first device to the second device on the link in lieu of the set of ordered sets.

Example 2 includes the subject matter of example 1, where the link includes an asymmetrical link and the particular interconnect protocol assumes the link to include a symmetrical link.

Example 3 includes the subject matter of any one of examples 1-2, where the set of ordered sets include a number of instances of a particular ordered set, each one of the number of instances of the particular ordered set is intended to be sent on a respective one of a number of lanes for the link, the link information in the data structure includes link information for a particular one of the number of lanes, and two or more lanes of the link are to be used to send the data structure.

Example 4 includes the subject matter of example 3, where the link actually includes fewer than the number of lanes.

Example 5 includes the subject matter of any one of examples 3-4, where the data structure includes a lane identifier to identify that the link information pertains to the particular lane.

Example 6 includes the subject matter of any one of examples 3-5, where the at least one data structure includes two or more data structures, a first one of the two or more data structures includes link information for the particular lane, and a second one of the two or more data structures includes link information for another one of the number of lanes.

Example 7 includes the subject matter of any one of examples 1-6, where each ordered set in the set of ordered sets includes a set of fields defined according to the particular interconnect, the set of fields include the link information, and the data structure includes fields corresponding to at least a portion of the set of fields.

Example 8 includes the subject matter of example 7, where the fields of the data structure further includes one or more particular fields to supplement the set of fields.

Example 9 includes the subject matter of any one of examples 1-18, where the link includes a plurality of lanes and the data structure includes is to be sent on the plurality of lanes by striping bits of the data structure across the plurality of lanes.

Example 10 includes the subject matter of any one of examples 1-9, where the interconnect protocol includes a Peripheral Component Interconnect Express (PCIe)-based protocol.

Example 11 includes the subject matter of any one of examples 1-10, where the set of ordered sets includes one or more instances of a pattern, and the translation layer circuitry is to separate the pattern from the link information and transmit the pattern on the link in addition to the data structure.

Example 12 includes the subject matter of example 11, where the pattern includes a high-speed link training sequence.

Example 13 includes the subject matter of example 12, where the pattern is defined to be used for at least one of bit lock or symbol lock during high speed link training.

Example 14 includes the subject matter of any one of examples 1-13, where the set ordered sets includes instances of a particular type of ordered set, generation of the data structure includes: detecting the particular type of ordered set; identifying that a particular one of a plurality of types of data structures corresponds to the particular type of ordered set; and generating the data structure according to the particular type of data structure.

Example 15 includes the subject matter of any one of examples 1-14, where the link information includes one or more of operational parameters for lanes of the link, link state transition information, and runtime status information for the link.

Example 16 includes the subject matter of any one of examples 1-15, where the translation layer circuitry is further to: receive a second data structure from the second device, where the second data structure includes second link information; and convert the second data structure into a second set of ordered sets, where the second set of ordered sets include synthetic ordered sets; and provide the second set of ordered sets to the interconnect protocol circuitry.

Example 17 includes the subject matter of example 16, where the second set of ordered sets is generated based on the second link information.

Example 18 includes the subject matter of any one of examples 16-17, where the translation layer circuitry is further to participate in training the link based on the second link information.

Example 19 is a method including: receiving, from protocol circuitry of a first device, a first set of ordered sets generated by the protocol circuitry according to a particular interconnect protocol, where the set of ordered sets is generated for a link to couple the first device to a second device, and the set of ordered sets includes link information for the link; converting the first set of ordered sets into at least one first data structure, where the first data structure includes at least a portion of the link information; and causing the first data structure to be sent on the link in lieu of the first set of ordered sets, where the link includes an asymmetric link.

Example 20 includes the subject matter of example 19, where the first data structure is according to a particular data structure format, and the method further includes: receiving a second data structure from the second device, where the second data structure includes second link information; and converting the second data structure into a second set of ordered sets, where the second set of ordered sets include synthetic ordered sets.

Example 21 includes the subject matter of example 20, where the second set of ordered sets is generated based on the second link information.

Example 22 includes the subject matter of any one of examples 20-21, further including participating in training the link based on the second link information.

Example 23 includes the subject matter of any one of examples 20-22, where the link includes an asymmetrical link and the particular interconnect protocol assumes the link to include a symmetrical link.

Example 24 includes the subject matter of any one of examples 20-23, where the set of ordered sets include a number of instances of a particular ordered set, each one of the number of instances of the particular ordered set is intended to be sent on a respective one of a number of lanes for the link, the link information in the data structure includes link information for a particular one of the number of lanes, and two or more lanes of the link are to be used to send the data structure.

Example 25 includes the subject matter of example 24, where the link actually includes fewer than the number of lanes.

Example 26 includes the subject matter of any one of examples 24-25, where the data structure includes a lane identifier to identify that the link information pertains to the particular lane.

Example 27 includes the subject matter of any one of examples 24-26, where the at least one data structure includes two or more data structures, a first one of the two or more data structures includes link information for the particular lane, and a second one of the two or more data structures includes link information for another one of the number of lanes.

Example 28 includes the subject matter of any one of examples 20-27, where each ordered set in the set of ordered sets includes a set of fields defined according to the particular interconnect, the set of fields include the link information, and the data structure includes fields corresponding to at least a portion of the set of fields.

Example 29 includes the subject matter of example 28, where the fields of the data structure further includes one or more particular fields to supplement the set of fields.

Example 30 includes the subject matter of any one of examples 20-29, where the link includes a plurality of lanes and the data structure includes is to be sent on the plurality of lanes by striping bits of the data structure across the plurality of lanes.

Example 31 includes the subject matter of any one of examples 20-30, where the interconnect protocol includes a Peripheral Component Interconnect Express (PCIe)-based protocol.

Example 32 includes the subject matter of any one of examples 20-31, where the set of ordered sets includes one or more instances of a pattern, and the translation layer circuitry is to separate the pattern from the link information and transmit the pattern on the link in addition to the data structure.

Example 33 includes the subject matter of example 32, where the pattern includes a high-speed link training sequence.

Example 34 includes the subject matter of example 33, where the pattern is defined to be used for at least one of bit lock or symbol lock during high speed link training.

Example 35 includes the subject matter of any one of examples 20-34, where the set ordered sets includes instances of a particular type of ordered set, generation of the data structure includes: detecting the particular type of ordered set; identifying that a particular one of a plurality of types of data structures corresponds to the particular type of ordered set; and generating the data structure according to the particular type of data structure.

Example 36 includes the subject matter of any one of examples 20-35, where the link information includes one or more of operational parameters for lanes of the link, link state transition information, and runtime status information for the link.

Example 37 is a system including means to perform the method of any one of examples 20-36.

Example 38 is a system including: a data processor; a port including protocol circuitry to implement a particular interconnect protocol, where the protocol circuitry is to generate a set of ordered sets defined according to the particular interconnect protocol, the set of ordered sets is generated for a link to couple the port to another port, and the set of ordered sets includes link information for the link; and translation layer circuitry to: generate, from the set of ordered sets, at least one data structure to include at least a portion of the link information; and cause the data structure to be sent from the first device to the second device on the link in lieu of the set of ordered sets.

Example 39 includes the subject matter of example 38, where the link possesses attributes not in compliance with the particular interconnect protocol, and the link information in the data structure includes information based on the attributes.

Example 40 includes the subject matter of example 39, further including a second device including the other port, where the other port includes logic to decode the data structure and establish the link based at least in part on the link information.

Example 41 includes the subject matter of any one of examples 38-40, where the link includes an asymmetrical link and the particular interconnect protocol assumes the link to include a symmetrical link.

Example 42 includes the subject matter of any one of examples 38-41, where the set of ordered sets include a number of instances of a particular ordered set, each one of the number of instances of the particular ordered set is intended to be sent on a respective one of a number of lanes for the link, the link information in the data structure includes link information for a particular one of the number of lanes, and two or more lanes of the link are to be used to send the data structure.

Example 43 includes the subject matter of example 42, where the link actually includes fewer than the number of lanes.

Example 44 includes the subject matter of any one of examples 42-43, where the data structure includes a lane identifier to identify that the link information pertains to the particular lane.

Example 45 includes the subject matter of any one of examples 42-44, where the at least one data structure includes two or more data structures, a first one of the two or more data structures includes link information for the particular lane, and a second one of the two or more data structures includes link information for another one of the number of lanes.

Example 46 includes the subject matter of any one of examples 38-45, where each ordered set in the set of ordered sets includes a set of fields defined according to the particular interconnect, the set of fields include the link information, and the data structure includes fields corresponding to at least a portion of the set of fields.

Example 47 includes the subject matter of example 46, where the fields of the data structure further includes one or more particular fields to supplement the set of fields.

Example 48 includes the subject matter of any one of examples 38-47, where the link includes a plurality of lanes and the data structure includes is to be sent on the plurality of lanes by striping bits of the data structure across the plurality of lanes.

Example 49 the subject matter of any one of examples 38-48, where the interconnect protocol includes a Peripheral Component Interconnect Express (PCIe)-based protocol.

Example 50 includes the subject matter of any one of examples 38-49, where the set of ordered sets includes one or more instances of a pattern, and the translation layer circuitry is to separate the pattern from the link information and transmit the pattern on the link in addition to the data structure.

Example 51 includes the subject matter of example 50, where the pattern includes a high-speed link training sequence.

Example 52 includes the subject matter of example 51, where the pattern is defined to be used for at least one of bit lock or symbol lock during high speed link training.

Example 53 includes the subject matter of any one of examples 38-52, where the set ordered sets includes instances of a particular type of ordered set, generation of the data structure includes: detecting the particular type of ordered set; identifying that a particular one of a plurality of types of data structures corresponds to the particular type of ordered set; and generating the data structure according to the particular type of data structure.

Example 54 includes the subject matter of any one of examples 38-53, where the link information includes one or more of operational parameters for lanes of the link, link state transition information, and runtime status information for the link.

Example 55 includes the subject matter of any one of examples 38-54, where the translation layer circuitry is further to: receive a second data structure from the second device, where the second data structure includes second link information; and convert the second data structure into a second set of ordered sets, where the second set of ordered sets include synthetic ordered sets; and provide the second set of ordered sets to the interconnect protocol circuitry.

Example 56 includes the subject matter of example 55, where the second set of ordered sets is generated based on the second link information.

Example 57 includes the subject matter of any one of examples 55-56, where the translation layer circuitry is further to participate in training the link based on the second link information.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
protocol circuitry to implement a protocol stack of a particular interconnect protocol, wherein the particular interconnect protocol defines a set of ordered sets to be used during training of a link to couple a first device to a second device, and the set of ordered sets comprises link information for the link; and
translation layer circuitry to:
generate at least one data structure to comprise at least a portion of the link information from the set of ordered sets; and
cause the data structure to be sent from the first device to the second device on the link in lieu of the set of ordered sets, wherein training of the link is to be based on the link information communicated in the data structure.

2. The apparatus of claim 1, wherein the link comprises an asymmetrical link and the particular interconnect protocol assumes the link to comprise a symmetrical link.

3. The apparatus of claim 1, wherein the set of ordered sets comprise a number of instances of a particular ordered set, each one of the number of instances of the particular ordered set is intended to be sent on a respective one of a number of lanes for the link, the link information in the data structure comprises link information for a particular one of the number of lanes, and two or more lanes of the link are to be used to send the data structure.

4. The apparatus of claim 3, wherein the link actually comprises fewer than the number of lanes.

5. The apparatus of claim 3, wherein the data structure comprises a lane identifier to identify that the link information pertains to the particular lane.

6. The apparatus of claim 3, wherein the at least one data structure comprises two or more data structures, a first one of the two or more data structures comprises link information for the particular lane, and a second one of the two or more data structures comprises link information for another one of the number of lanes.

7. The apparatus of claim 1, wherein each ordered set in the set of ordered sets comprises a set of fields defined according to the particular interconnect, the set of fields comprise the link information, and the data structure comprises fields corresponding to at least a portion of the set of fields.

8. The apparatus of claim 7, wherein the fields of the data structure further comprises one or more particular fields to supplement the set of fields.

9. The apparatus of claim 1, wherein the link comprises a plurality of lanes and the data structure is to be sent on the plurality of lanes by striping bits of the data structure across the plurality of lanes.

10. The apparatus of claim 1, wherein the interconnect protocol comprises a Peripheral Component Interconnect Express (PCIe)-based protocol and the set of ordered sets comprises at least one of a TS1 ordered set, a TS2 ordered set, or a SKP ordered set.

11. The apparatus of claim 1, wherein the set of ordered sets comprises one or more instances of a pattern, and the translation layer circuitry is to separate the pattern from the link information and transmit the pattern on the link in addition to the data structure.

12. The apparatus of claim 11, wherein the pattern comprises a high-speed link training sequence.

13. The apparatus of claim 12, wherein the pattern is defined to be used for at least one of bit lock or symbol lock during high speed link training.

14. The apparatus of claim 1, wherein the set ordered sets comprises instances of a particular type of ordered set, generation of the data structure comprises:
detecting the particular type of ordered set;
identifying that a particular one of a plurality of types of data structures corresponds to the particular type of ordered set; and
generating the data structure according to the particular type of data structure.

15. The apparatus of claim 1, wherein the link information comprises one or more of operational parameters for lanes of the link, link state transition information, and runtime status information for the link.

16. A method comprising:
receiving, from protocol circuitry of a first device, a first set of ordered sets to be generated according to a particular interconnect protocol, wherein the set of ordered sets is generated for a link to couple the first device to a second device, the set of ordered sets are defined in the particular interconnect protocol to be used during training of the link, and the set of ordered sets comprises link information for the link;
converting the first set of ordered sets into at least one first data structure, wherein the first data structure comprises at least a portion of the link information;
causing the first data structure to be sent on the link in lieu of the first set of ordered sets, wherein the link comprises an asymmetric link; and
training the link based at least in part on the portion of the link information sent with the first data structure.

17. The method of claim 16, wherein the first data structure is according to a particular data structure format, and the method further comprises:
receiving a second data structure from the second device, wherein the second data structure comprises second link information;
converting the second data structure into a second set of ordered sets, wherein the second set of ordered sets comprise synthetic ordered sets, wherein the training of the link is further based on the second link information.

18. A system comprising:
a data processor;
a port comprising protocol circuitry to implement a particular interconnect protocol, wherein the particular interconnect protocol defines a set of ordered sets to be used during training of a link to couple the port to another port, and the set of ordered sets comprises link information for the link; and
translation layer circuitry to:
generate at least one data structure to comprise at least a portion of the link information from the set of ordered sets; and
cause the data structure to be sent from the port to the other port on the link in lieu of the set of ordered sets, wherein training of the link is to be based on the link information communicated in the data structure.

19. The system of claim 18, wherein the link possesses attributes not in compliance with the particular interconnect protocol, and the link information in the data structure comprises information based on the attributes.

20. The system of claim 19, further comprising a second device comprising the other port, wherein the other port comprises logic to decode the data structure and establish the link based at least in part on the link information.

* * * * *